Feb. 16, 1926.
J. M. THOMAS
1,573,285
PISTON AND PISTON RING
Filed Nov. 16, 1921
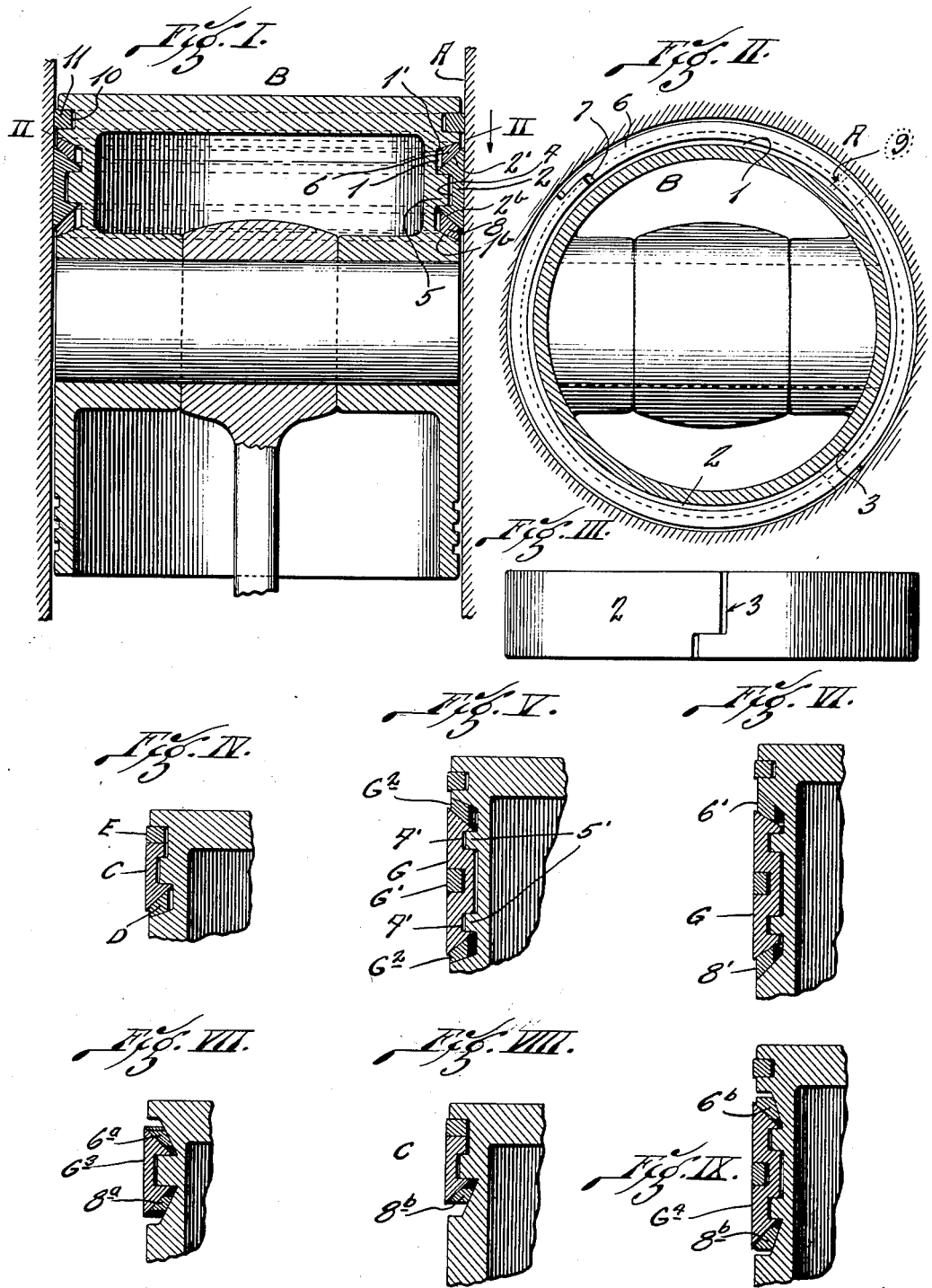
Inventor:
Jesse M. Thomas
by Cook & McCauley Attys.

Patented Feb. 16, 1926.

1,573,285

UNITED STATES PATENT OFFICE.

JESSE M. THOMAS, OF PINE LAWN, MISSOURI, ASSIGNOR OF ONE-THIRD TO WILLIAM D. GRUELLE, OF ST. LOUIS, MISSOURI.

PISTON AND PISTON RING.

Application filed November 16, 1921. Serial No. 515,436.

*To all whom it may concern:*

Be it known that I, JESSE M. THOMAS, a citizen of the United States of America, a resident of Pine Lawn, in the county of St. Louis, State of Missouri, have invented certain new and useful Improvements in Pistons and Piston Rings, of which the following is a full, clear, and exact description, reference being had to the accompanying drawings, forming a part of this specification.

This invention relates to packings for pistons and is particularly adapted for use in old internal combustion engines. Long and continued use of an internal combustion engine results in a wearing away of the piston and cylinder at the contacting faces thereof and eventually this wearing away will result in a perceptible annular space between the periphery of the piston and the inside face of the cylinder, in which condition the efficiency of the engine is greatly impaired due to the fact that it is practically impossible to prevent leakage, with the ordinary piston rings. Furthermore, the loose piston is free to strike hammer blows on the face of the cylinder, and the piston is connected to a crank in such a manner that the pressure in the cylinder causes lateral displacement of the loose piston.

In the use of my improved packing, the loose piston is centralized within, and positively separated from the face of the cylinder, while the piston ring not only fits snugly with its outer periphery against the inner face of the cylinder, but a gas-tight transverse joint is provided between the piston ring and the upper and lower walls of the piston ring groove. As a consequence, leakage of gas is eliminated and the hammer blows usually resulting from loose pistons are prevented.

Briefly stated, the preferred form of my invention comprises a piston provided with a comparatively wide piston ring groove, having an inclined upper wall and an inclined lower wall. A piston ring, provided with an inclined upper face and an inclined lower face, is located in the piston ring groove. Interposed between the inclined upper wall of the piston ring groove and the inclined upper face of the piston ring is a secondary ring, preferably an expanding ring, provided with inclined faces corresponding to the inclined faces of the piston ring groove and the piston ring, and interposed between the inclined lower wall of the piston ring groove and the inclined lower face of the piston ring is a ring similar to the secondary ring just described. The secondary rings force the peripheral face of the piston ring snugly against the inside face of the cylinder and maintain this snug contact regardless of the continual wearing away of said piston ring and said cylinder wall. The secondary rings also co-operate with the other ring to separate the piston from the cylinder.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a fragmentary vertical section through a portion of a cylinder of an explosive engine having therein a piston provided with rings embodying the features of this invention.

Fig. II is a horizontal section on line II—II of Fig. I.

Fig. III is a side elevation of the piston ring forming a part of this invention.

Fig. IV is a fragmentary section of another form of the invention showing the piston ring used in connection with a single expansible ring.

Fig. V is a modification showing the form of the invention when used with heavy duty engines.

Fig. VI is a modification showing a form of the invention wherein a contracting ring is utilized to force the piston ring outwardly against the inner face of the cylinder.

Fig. VII is a modification showing another form of the invention wherein contracting rings are used to keep the piston ring in close contact with the face of the cylinder.

Fig. VIII is a modification showing a form of the invention wherein a single contracting ring is used.

Fig. IX is a modification of the invention showing a form intended for heavy duty engines wherein contracting rings are used.

In Figs. I and II of the drawings I have shown a fragment of a cylinder A of an explosive engine, which is of the usual form, and in which is disposed a piston B. Formed in said piston, at a point adjacent to the upper wall thereof, is a circumscribing groove 1, the upper and lower walls of which are inclined whereby a pair of annular inclined faces 1' and 1ᵇ are provided, the purpose of which will be hereinafter fully set forth.

Located within the groove 1 is an expansible piston ring 2, the width of which is less than the width of the groove 1, and which is provided with an inclined upper face 2' and an inclined lower face 2ᵇ, the ends of said piston ring being provided with a lap joint 3. Said piston ring 2 is provided with an annular groove 4 adapted to receive an annular rib 5 formed on the piston within the piston ring groove 1 midway between the inclined faces 1' and 1ᵇ, said rib 5 being adapted to prevent said piston ring 2 from moving longitudinally of said piston, within said piston ring groove 1.

Interposed between the inclined face 1' of the piston ring groove and the inclined face 2' of the piston ring is an inherently expansible secondary ring 6, which is provided with a lap joint 7, and interposed between the inclined face 1ᵇ of the piston ring groove 1 and the inclined face 2ᵇ of the piston ring is a similar expansible ring 8, which is likewise provided with a lap joint 9. The lap joints 7 and 9 of the secondary rings and the lap joint 3 of the piston ring are broken, i. e., are located at different points in the groove 1, to avoid the danger of a direct leak through the packing.

Each of the secondary rings 6 and 8 is provided with an upper and a lower inclined face conforming to the inclinations of the faces with which they are engaged. The inclined upper face of the ring 6 corresponds to the inclination of the face 1' of the piston ring groove and the inclined lower face of said ring 6 corresponds to the inclination of the face 2' of the piston ring. This is also true of the ring 8, its inclined faces corresponding to the inclination of the faces against which they bear.

Formed in the piston immediately above the piston ring groove 1 is a groove 10 which receives an ordinary expansible piston ring 11 adapted to bear against the inside face of the cylinder A.

In the application of my improved packing to a piston which has become worn through constant use, said piston may be first provided with a piston ring groove such as that illustrated in Fig. I of the drawing, after which the ring members are assembled as shown in that view. When the ring members are properly assembled, the secondary expansible rings 6 and 8 exert an outward pressure against the piston ring 2 whereby the periphery of said piston ring will be forced into snug contact with the inner face of the cylinder A and the piston B will be held in a centralized position within said cylinder, and because the joints of said rings are broken the pressure against said piston ring will be substantially uniform throughout the circumference of said piston ring. The constant contact of the piston ring 2 against the wall of the cylinder A will result in both of the parts wearing away and as this wear occurs the secondary rings 6 and 8 will expand radially, and because of the inclination of the faces already described said piston ring will be forced outwardly so that a close contact is always maintained between the piston ring 2 and the inner face of the cylinder A.

The secondary expansible rings 6 and 8 are wedge-shaped in cross section and the action obtained when said secondary rings expand radially is a sliding, wedging action which is very powerful and which positively forces the piston ring outwardly against the wall of the cylinder. These secondary rings may be termed "spacing rings", for they cooperate with the ring 2 to separate the piston from the cylinder. Furthermore, the joints made by the secondary rings tightly wedged between the piston ring 2 and the inclined walls of the piston ring groove prevent the escape of gas across the inner face of the piston ring 2.

The auxiliary piston ring 11 is utilized as a baffle to prevent the explosions in the cylinder from acting with full force on the packing. If the upper secondary ring is forced inwardly the pressure of the piston ring against the cylinder wall will be lessened, and it is therefore desirable to use the auxiliary ring 11.

Fig. IV shows a modification wherein a piston ring C is forced outwardly by a single secondary expansible ring D, an auxiliary ring E being provided to prevent leakage at the upper edge of said piston ring C.

Fig. V shows a form of the invention intended particularly for heavy duty engines, wherein a pair of annular grooves 4' are formed in the piston ring G to receive a pair of annular ribs 5' on the piston. The piston ring G in this form is provided with an auxiliary ring G'. Expanding secondary rings G² cooperate with the ring G to space the piston from the cylinder.

Fig. VI shows the same construction as that shown in Fig. V, except that the secondary rings 6' and 8', instead of being expanding rings, are contracting rings. In this form the action is the same as in the construction shown by Fig. V, except that the contraction of the secondary rings will force the piston ring G outwardly against the cylinder wall.

Fig. VII is another form showing contracting rings 6ª and 8ª for forcing the piston ring G³ outwardly against the cylinder wall.

Fig. VIII is the same form as Fig. IV except that a contracting ring 8ᵇ is substituted for the expanding ring in that view, and the piston groove has an inclined wall cooperating with the contracting ring 8ᵇ and piston ring C to separate the piston from the cylinder.

Fig. IX is the same form as Fig. VI except that contracting rings 6ᵇ and 8ᵇ are substituted for the expanding rings shown in Fig. VI, and the piston groove has inclined walls engaged by the contracting rings to force the piston ring G⁴ away from the piston.

I claim:

1. A piston having an annular piston ring groove, a wall of which is inclined, a piston ring having an inclined face located within said piston ring groove and a peripheral face adapted to bear against the inside face of the cylinder within which said piston operates, said piston ring being provided with a groove and the piston being provided with a rib which lies within the last mentioned groove, and a secondary ring having inclined faces interposed between the inclined wall and the inclined face of said piston ring, whereby a radial movement of said secondary ring will impart radial movement to said piston ring.

2. A piston having an annular piston ring groove, a wall of which is inclined, a piston ring having an inclined face located within said piston ring groove and a peripheral face adapted to bear against the inside face of the cylinder within which said piston operates, said piston ring being provided with an annular groove, and the piston being provided with an annular rib which lies within the last mentioned groove, and a secondary ring having inclined faces interposed between the inclined wall and the inclined face of said piston ring, whereby a radial movement of said secondary ring will impart radial movement to said piston ring.

3. A piston having an annular piston ring groove, a wall of which is inclined, a piston ring having an inclined face located within said piston ring groove and a peripheral face adapted to bear against the inside face of the cylinder within which said piston operates, a secondary ring having inclined faces adapted to bear against the inclined face of said piston ring and the inclined wall of said piston ring groove, whereby a radial movement of said secondary ring will impart radial movement to said piston ring, and auxiliary packing means between said piston and said cylinder to prevent free escape of fluid from the cylinder to said piston ring and secondary ring.

4. A piston having an annular piston ring groove, a wall of which is inclined, a piston ring having an inclined face located within said piston ring groove and a peripheral face adapted to bear against the inside face of the cylinder within which said piston operates, a secondary ring having inclined faces adapted to bear against the inclined face of said piston ring and the inclined wall of said piston ring groove, whereby a radial movement of said secondary ring will impart radial movement to said piston ring, said piston having an auxiliary piston ring groove adjacent to the first mentioned piston ring groove, and an auxiliary piston ring in said auxiliary piston ring groove.

5. A piston having an annular piston ring groove provided with inclined walls, a piston ring having inclined faces located within said piston ring groove and a peripheral face adapted to bear against the inside face of the cylinder within which said piston operates, and secondary rings of varying diameters interposed between the inclined walls of the piston ring groove and the inclined faces of the piston ring.

6. A piston having an annular piston ring groove provided with an inclined upper wall and an inclined lower wall, a piston ring having an inclined upper face and an inclined lower face located within said piston ring groove and a peripheral face adapted to bear against the inside face of the cylinder within which said piston operates, and secondary rings of varying diameters, one of said secondary rings being located between the inclined upper wall of the piston ring groove and the inclined upper face of the piston ring, and the other being located between the inclined lower wall of the piston ring groove and the inclined lower face of the piston ring whereby a radial movement of said secondary rings will impart radial movement to said piston ring.

7. A piston having an annular piston ring groove provided with inclined walls, a piston ring having inclined faces located within said piston ring groove and a peripheral face adapted to bear against the inside face of the cylinder within which said piston operates, secondary rings of varying diameters interposed between the inclined walls of the piston ring groove and the inclined faces of the piston ring, and means whereby said piston ring is prevented from moving longitudinally of said piston.

8. A piston having an annular piston ring groove provided with inclined walls, a piston ring having inclined faces located within said piston ring groove and a peripheral face adapted to bear against the inside face of the cylinder within which said piston operates, said piston ring being provided with a groove and the piston being provided with a rib which lies within the last mentioned groove whereby said piston ring is prevented from moving longitudinally of said piston, and secondary rings of variable diameters interposed between the inclined walls of said piston ring groove and the inclined faces of the piston ring.

9. A piston having an annular piston ring groove provided with an inclined upper wall and an inclined lower wall, a piston ring having an inclined upper face and an inclined lower face located within said piston ring groove and a peripheral face adapted to bear against the inside face of the cylinder within which said piston operates, said piston ring being provided with an annular groove and the piston being provided with an annular rib located within said piston ring groove and extending into said annular groove to prevent said piston ring from moving longitudinally of said piston, and secondary rings of varying diameters, one of which is located between the inclined upper wall of the piston ring groove and the inclined upper face of the piston ring, and the other of which is located between the inclined lower wall of the piston ring groove and the inclined lower face of the piston ring whereby a radial movement of said secondary rings will impart radial movement to said piston ring.

10. A piston having an annular piston ring groove provided with an inclined upper wall and an inclined lower wall, a piston ring having an inclined upper face and an inclined lower face located within said piston ring groove and a peripheral face adapted to bear against the inside face of the cylinder within which said piston operates, an annular rib being formed on said piston within said piston ring groove, said piston ring having an annular groove to receive said rib, whereby said piston ring is prevented from moving longitudinally of said piston, secondary rings of varying diameters, one of which is located between the inclined upper wall of the piston ring groove and the inclined upper face of the piston ring, and the other of which is located between the inclined lower wall of the piston ring groove and the inclined lower face of the piston ring whereby a radial movement of said secondary rings will impart radial movement to said piston ring, and an auxiliary packing ring located in said piston to prevent free escape of fluid pressure from the cylinder to said piston ring and said secondary rings.

In testimony that I claim the foregoing I hereunto affix my signature.

JESSE M. THOMAS.